Jan. 9, 1968   B. ADAM   3,362,090
PHYSIO-THERAPY APPARATUS
Filed Dec. 17, 1965   3 Sheets-Sheet 2

INVENTOR
BERNARD ADAM
BY Norman N. Popper
ATTORNEY

Jan. 9, 1968   B. ADAM   3,362,090
PHYSIO-THERAPY APPARATUS
Filed Dec. 17, 1965   3 Sheets-Sheet 3
FIG. 4
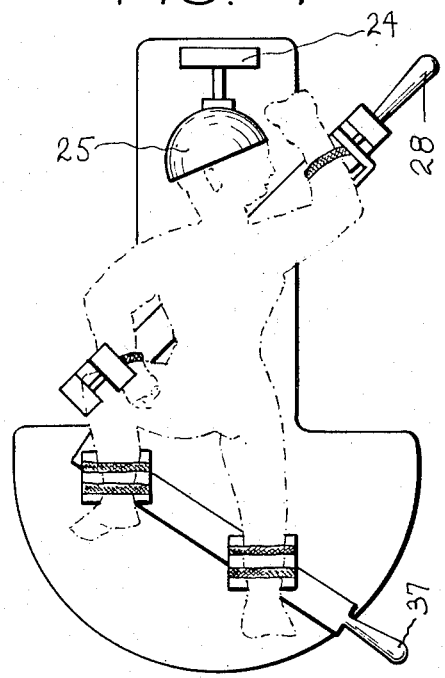
FIG. 5
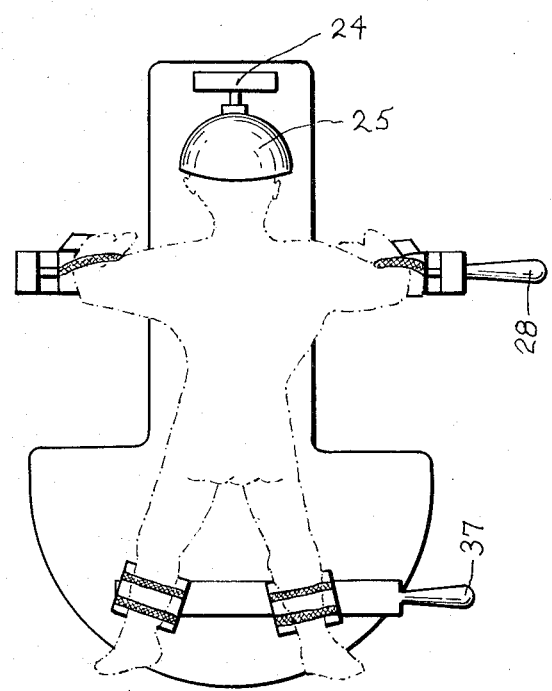
FIG. 6
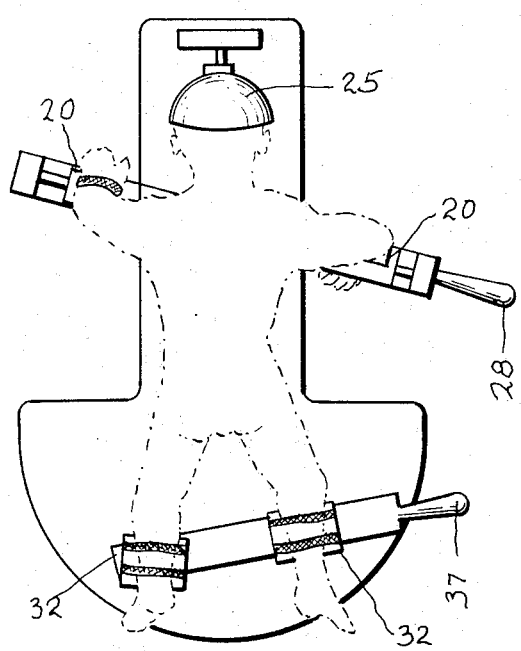
FIG. 7
INVENTOR
*BERNARD ADAM*
BY Norman N. Popper
ATTORNEY United States Patent Office
3,362,090
Patented Jan. 9, 1968

3,362,090
PHYSIO-THERAPY APPARATUS
Bernard Adam, R.D. 1, Whitehouse Station, N.J. 08889
Filed Dec. 17, 1965, Ser. No. 514,446
7 Claims. (Cl. 35—29)

This invention relates generally to a physio-therapy apparatus and more particularly to physio-therapy apparatus for teaching the gestalts known as the cross-pattern, and the homo-lateral pattern.

It is an object of the invention to coordinate a plurality of complex movements constituting the crawl or creep pattern.

It is the further object of the invention to enable one person to teach the gestalts.

It is yet a further object of the invention to provide an apparatus which accompanies the performance of the gestalt with tactile stimuli.

It is an object of the invention to coordinate head, neck, wrist, arm, back, shoulder, leg, ankle and arm movements into a useful, meaningful gestalt that accomplishes coordinated movement.

These objects and advantages as well as other objects and advantages may be attained by the device shown by way of illustration in the drawings, in which:

FIGURES 4, 5, 6 and 7 show the reciprocation of the handles toward each other from the position shown in FIGURE 4 to the position shown in FIGURE 5; then to a position shown in FIGURE 6 and ultimately to the position shown in FIGURE 7, which constitutes and accomplishes the performance of one-half of the gestalt of crawling.

Figure 1:
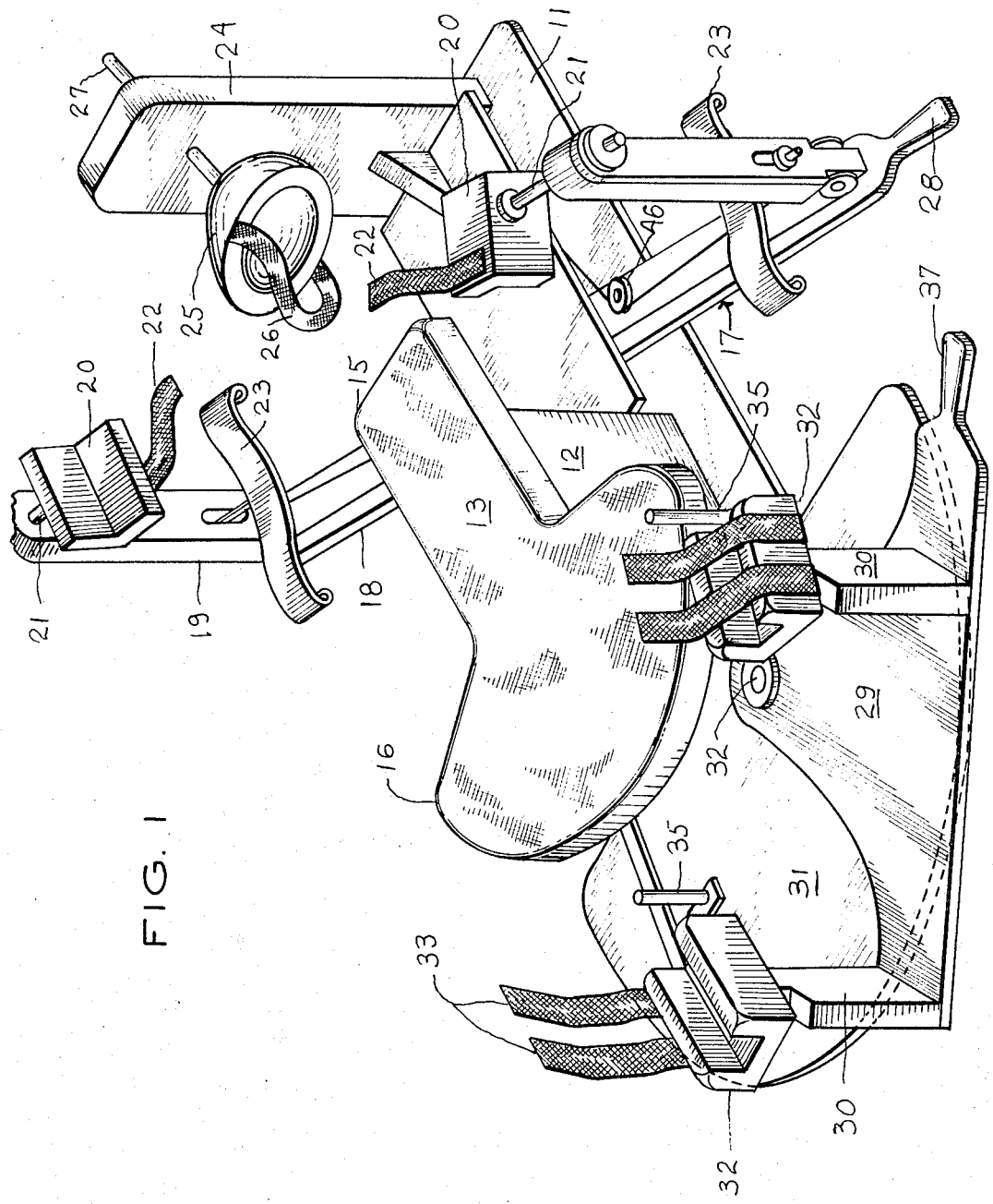
FIGURE 1 is a perspective view of the physio-therapy apparatus.

With children afflicted with cerebral palsy or brain damage due to congenital birth defects, accident or disease, it has been found that a physio-therapy apparatus can manipulate the limbs of such children through a gestalt known as the "cross-pattern" or homo-lateral movement, and with repetition of the gestalt, the child learns the simple movement. Children with brain damage seem to lack any instinct that compels or induces such movements unaided, so that the instinct must find a substitute in forced manipulation. The accomplishment of the pattern gestalt by manual manipulation is impossible for one therapist unaided to perform, and requires the attendance of three therapists for each child. Larger and more mature infants may require as many as five therapists, all properly trained to synchronize their respective manipulations.

The apparatus herein referred to can easily be manipulated by one person with but slight special training; it synchronizes the movements of the limbs in the performance of the gestalt, and makes the manipulation simple, lacking in monotony for the person operating the machine. The machine compels the performance of the crawling or creeping movement of a developing infant which is one of the most primitive and rudimentary activities that a child engages in a quasi-conscious and controlled effort, in contradistinction to such activities as the nursing reflex. The machine presents the tactile stimuli of crawling, accompanied by head reciprocation, wrist tilting and ankle and knee flexing. The homo-lateral gestalt is a complete simulation of crawling, and by reason of its precision, learning proceeds at a rapid rate. The homo-lateral gestalt is the first step toward development of useful movement, and having been learned, is more easily succeeded by cross-pattern gestalts. The body develops through the improvement of muscle tone, and the waste removal organs improve their function by reason of the stimulation imparted by physical activities. The former vegetative existence is soon left behind.

Referring now to the drawings in detail, there is provided in the physio-therapy apparatus a base 11, a vertical member 12 is mounted on the base. A table or body 13 is mounted on the vertical member 12. The body-rest 13 is dimensioned to support an infant's torso 14, as will be seen in FIGURES 4, 5, 6 and 7. The table has an elongated forward portion 15, and an outflared rear portion 16. The child is placed upon the body-rest 13. An arm support assembly 17 is provided. There is a transverse bar 18 pivotably mounted upon the base 11. At each end of the bar 18, there is a vertical support 19. At the top of each vertical support 19, there is provided an arm support 20. Each arm support is mounted pivotally on a shaft 21. The arm supports 20 have attachment straps 22, so that when the arm of the child on the body-rest 13 is placed on the top of the arm support 20, the strap 22 can secure it in place. For this type of fastening, the fabric known as Velcro (consisting of hooked monofilaments and a complementary fabric of looped pile monofilaments) is very satisfactory. Immediately below the wrist support 20, there is provided a tactile panel 23. Vertical movement of the arm supports 20 causes the arm and wrist to be tilted downwardly, so that the finger tips trail across the tactile panel 23. This provides the stimulus which normally accompanies the action of crawling and creeping. The tactile sensation imparted to the fingers is part of the gestalt of crawling. Likewise, the tilting of the wrists and the hands downwardly is part of the same gestalt. The arm supports 20, being pivotable, are caused to tilt in opposite directions from each other by means hereinafter set forth. The tactile panels 23 may be covered with a high friction rough, or smooth textured fabric surface (not shown) to enhance and accentuate the tactile sensation imparted to fingers trailed over the tactile panel 23.

A the front end of the base 11, there is another vertical support 24. Mounted on the vertical support 24 is a cup 25, which serves to hold the head of the child. The head of the child is held in place in the cup 25 by a strap 26 (of similar character to the strap 22 on the arm supports 20), or the strap 26 may be elasticized or with padded side pieces. Any means, beside the cup 25 which can hold or turn the head may be used. The cup 25 is mounted on a shaft 27. The reciprocation of the shaft 27 will cause the head of the child to turn alternately from right to left toward the wrist which is moving forward on the arm support 20. This is another feature of the creeping or crawling gestalt for the head is normally directed in that gestalt toward the advancing hand for the purpose of visually inspecting the area in which forward movement would normally ensue. The reciprocation of the cup 25 is accomplished by cables and pulleys, as is the tilting of the arm support 20, and this will also be later described. At the end of the transverse bar 18, there is a handle 28, which is manually grasped by the operator for the purpose of reciprocating the bar 18.

At the rear end of the base 11, there is a pivotally mounted generally horizontal segment 29, which constitutes a platform upon which rear vertical supports 30 are mounted. The rear portion of the base 11 is provided with an outflared portion 31 to which the pivot pin 32 is attached, and serves as a means for supporting the segment 29 as it is reciprocated. At the top of each of the rear vertical supports 30, there is a pivotally mounted generally U-shaped elongated leg support 32. Attachment straps 33, similar to the attachment straps 22, are here provided. The leg supports 32, 32 are connected to radius rods 34, 34. Each ankle support 32 has a generally vertical pin 35, which encounters the back of the knee of the infant and encourages the leg bend of the more spastic infants. Radius rods 34 keep the leg supports 32, 32 parallel to the body at any position and bend the child's knee during the creeping or crawling gestalt.

Figure 2:
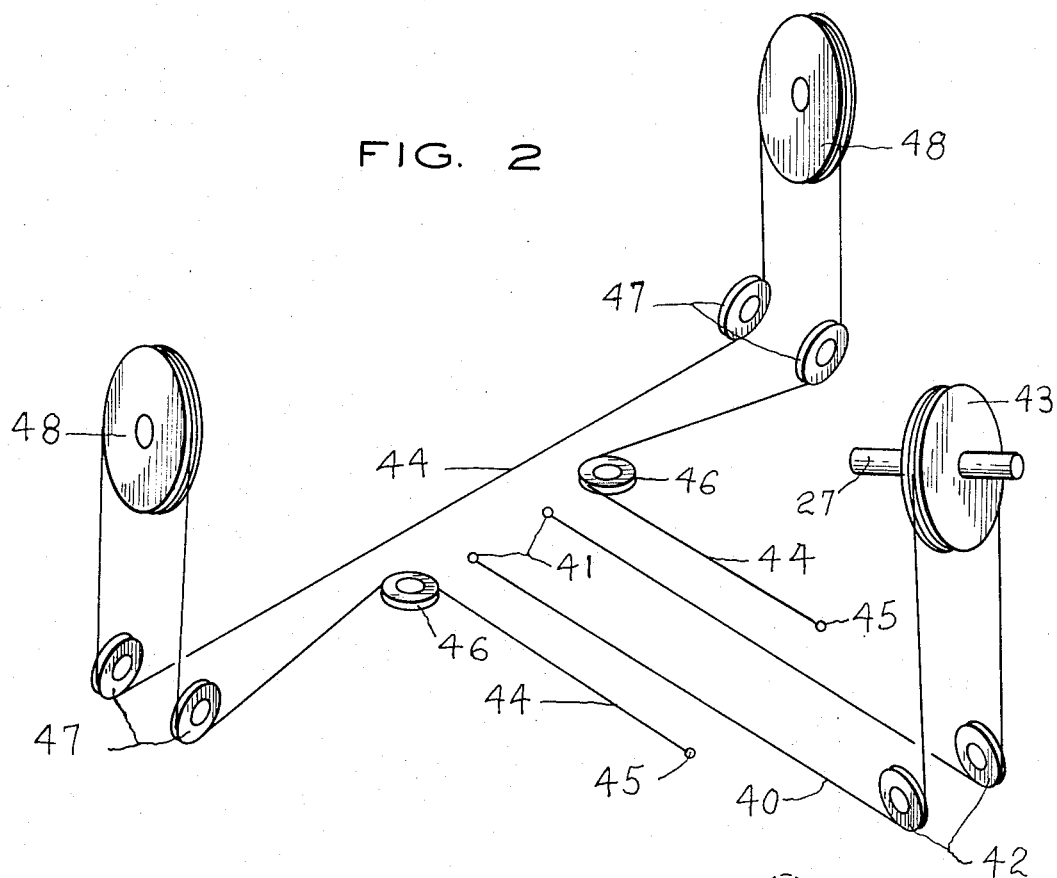
FIGURE 2 is a view of the cable drives of the physio-therapy apparatus.
Figure 3:
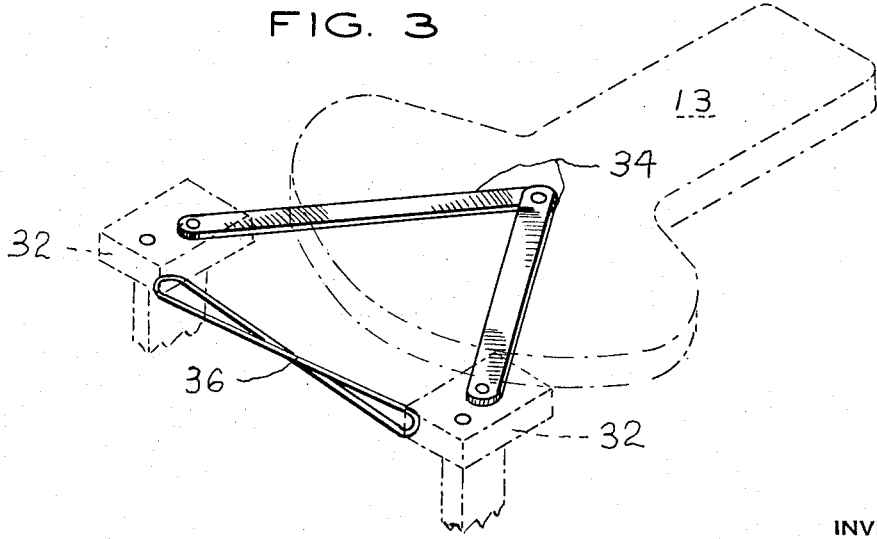
FIGURE 3 is a perspective view of the positioning means for the supports.

The leg supports 32, 32 are connected together by an elasticized strap or spring 36 (see FIGURE 3). Thus, when the segment 29 is pivoted to one side so as to flex the knee on that side, as shown in FIGURES 4 and 7, the leg supports 32, 32 (which hold the leg which is flexing at the knee) remain oriented, as they were in the normal position shown in FIGURES 5 and 6, thereby causing the foot on the bent leg to flex in an outward direction, as shown in FIGURES 4 and 7 by reason of an automatic twist imparted at the hip when the knee is drawn up. The same thing occurs when the other leg is flexed at the knee. The radius rods 34, 34 and the tension exerted upon the leg supports 32, 32 by the spring or strap 36, tends to normally maintain the leg supports 32, 32 in substantial alignment and general parallelism with each other. The outflaring motion of the foot of the infant is part of the gestalt pattern related to crawling or creeping, and reflects the normal presentation of a foot broadside on a surface over which an infant crawls, in order to provide the maximum leverage. In cross-pattern movements, as shown in FIGURES 4, 5, 6 and 7, the gestalt reflects pressure exerted by the left foot and pull exerted by the right arm and hand at the same time in a crawling or creeping movement; likewise, the opposite occurs, i.e., pressure exerted by the right foot and pull exerted by the left arm and hand, when the handles 28, 37 are moved apart. Thus, it will be seen that the coordinated components of the gestalt are pieced together by the physio-therapy apparatus. The segment 29 has a handle 37 corresponding with the handle 28. The therapist operating the physio-therapy apparatus has only to reciprocate the handles from a median position, in opposite direction, and the cross-pattern gestalt is automatically formed, or the travel handles 28 and 37 may be simultaneously moved in the same direction to obtain a homo-lateral gestalt. The learning periods may be approximately 5 minutes or longer, and should be performed at least four times each day until the gestalt is meaningful and learned. Other gestalts are subsequently more easily performed once this basic pattern is acquired. The operation of the machine is accomplished automatically insofar as the leg supports 32, 32 are concerned, when the handle 37 is reciprocated. However, reciprocation of the handle 28 in correspondence with the handle 37 in opposite directions will drive the head support or cup 25, and the arm supports 20, 20. This is accomplished by cables and pulleys. One cable 40 is attached at both ends 41, 41 to the transverse bar 18. Pulleys 42, 42 change the direction of the cable to an upward direction and the cable 40 is wrapped around a pulley 43, mounted upon the shaft 27, as shown in FIGURE 2. The shaft 27 is attached to the head supporter cup 25, as shown in FIGURE 1. Thus, the reciprocation of the transverse bar 18 will cause the cup or head support 25 to rotate from right to left and back again, thereby producing head movements which are a component of the gestalt. A second cable 44 is attached at both ends 45, 45 to the base 11. This cable traverses a pair of pulleys 46, 46 mounted on the transverse bar 18 which cause a 90 degree change in direction of the cable 44 at the outer ends of the transverse bar 18. Mounted on the outer ends of the transverse bar 18 are pairs of pulleys 47, 47. These accomplish a vertical change of direction of the cable 44, which extends upwardly and wraps over a pulley 48 mounted on the shafts 21, 21, which carry the arm supports 20, 20. Thus, it will be seen that the reciprocation of the transverse bar 18 causes the cable 44 to rotate the drive pulleys 48, 48, which in turn rotate the shafts 21, 21, and cause the vertical tilting of the arm supports 20, 20. This causes the arm wrist movements which are a component part of the gestalt, and involve reaching and pulling alternately, opposite to pushing with the feet. The pronation of the hand so that the fingers trail over the tactile panel 23, is a normal incident of the crawling and creeping gestalt and provides a simulation of the tactile experience accompanying the crawling and creeping gestalt. Once the gestalt is learned by repeated exercise on the machine, the machine becomes unnecessary, and the gestalt is performed on a crawl surface. By reason of the ease with which the gestalt movements are induced in an infant by the machine, learning proceeds rapidly, and the first steps in development are accomplished.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specificially catalogued herein.

What is claimed is:
1. A physio-therapy apparatus comprising:
   (a) a base;
   (b) a table dimensioned to support a torso over the base;
   (c) a reciprocable support means connected to the base and supporting a pair of leg supports radially reciprocable and pivotable during such reciprocation;
   (d) a reciprocable support means connected to the base and supporting a pair of arm supports radially reciprocable with respect to the table and also vertically pivotable;
   (e) means to hold the legs on the leg supports;
   (f) means to hold the arms on the arm supports;
   (g) a rotatable head support operably connected to the arm supports;
   (h) handles on the ends of the leg and arm reciprocable means.
2. A physio-therapy apparatus comprising:
   (a) the device according to claim 1, and
   (b) the head support turning to face the arm support on the side where the arm support is moved to the forward position.
3. A physio-therapy apparatus comprising:
   (a) the device according to claim 1, and
   (b) each arm support operably connected to the other for pivotal downward movement of its front end as the arm support reaches the forward position and the opposite arm support for pivotal upward movement of its front end, as that arm support reaches the rearward position.
4. A physio-therapy apparatus comprising:
   (a) the device according to claim 1, and
   (b) the leg supports operably connected together for opposite pivotal movement during reciprocation.
5. A physio-therapy apparatus comprising:
   (a) the device according to claim 1, and
   (b) a surface below each of the arm supports positioned for tactile contact by the fingers of the hand on the arm support.
6. A physio-therapy apparatus comprising:
   (a) the device according to claim 1, and
   (b) radius rods connecting the leg supports to the table, and
   (c) a resilient strap normally urging the leg supports in general parallelism to each other.
7. A physio-therapy apparatus comprising:
   (a) the device according to claim 1, and
   (b) the head support turning to face the arm support on the side where the arm support is moved to the forward position;

(c) each arm support operably connected to the other for pivotal downward movement of its front end as the arm support reaches the forward position and the opposite arm support for pivotal upward movement of its front end, as that arm support reaches the rearward position;

(d) the leg supports operably connected together for opposite pivotal movement as the segment is reciprocated;

(e) a surface below each of the arm supports positioned for tactile contact by the fingers of the hand on the arm support;

(f) radius rods connecting the leg supports to the table, and (g) a resilient strap normally urging the leg supports in general parallelism to each other.

References Cited
UNITED STATES PATENTS

| | | | |
|---|---|---|---|
| 1,620,146 | 3/1927 | Walton | 272—71 |
| 2,093,830 | 9/1937 | Flatley | 128—25 |
| 2,109,775 | 3/1938 | Hudson | 35—29 |
| 2,892,455 | 6/1959 | Hutton | 128—25 |

EUGENE R. CAPOZIO, *Primary Examiner.*

H. S. SKOGQUIST, *Assistant Examiner.*